Nov. 23, 1926.

H. RENKHOFF 1,607,748

TILTABLE SLIDING SEAT FOR BICYCLES

Filed Jan. 29, 1925

Inventor:
Heinrich Renkhoff
by
Atty.

Patented Nov. 23, 1926.

1,607,748

UNITED STATES PATENT OFFICE.

HEINRICH RENKHOFF, OF DUISBURG-RUHRORT, GERMANY, ASSIGNOR TO BUCHLOH & RENKHOFF G. M. B. H., OF DUISBURG-RUHRORT, GERMANY.

TILTABLE SLIDING SEAT FOR BICYCLES.

Application filed January 29, 1925, Serial No. 5,593, and in Germany August 2, 1924.

This invention has for its object to simplify the elements required for the manufacturing of the tiltable sliding saddle for bicycles as described and claimed in my prior application Serial Number 721,554 of June 21, 1924, and further to improve the arrangement of these elements. According to my prior application the leather seat rests with two lateral wire bows in projecting extensions of the S-shaped sliding frame which is composed of two parts, said wire bows being clamped in position by means of plates and screws, the frame itself being fixed at the head ends by means of screws with the sliding rod which is adapted to slide and rotate in the sleeve which supports the seat.

According to the present invention a straight sliding frame is substituted for the S-shaped frame so that the leather side and its supporting spring may be fixed on the frame and be easily adjusted in vertical direction, the sliding frame being connected with the slidable rod at the front end by means of a screw with eye and at the rear end directly. The spring on the seat support which serves to limit the rotation of the frame and to return the same to the median position is fitted with rollers, the spring itself being composed of two parts and mounted on the supporting tube adjustable in the vertical plane. The shape of the rollers is adapted to the shape of the sliding path, so that the spring supported rollers are prevented from getting off the sliding path.

An embodiment of the invention is shown, by way of example, on the accompanying drawing, in which.

Figure 1:
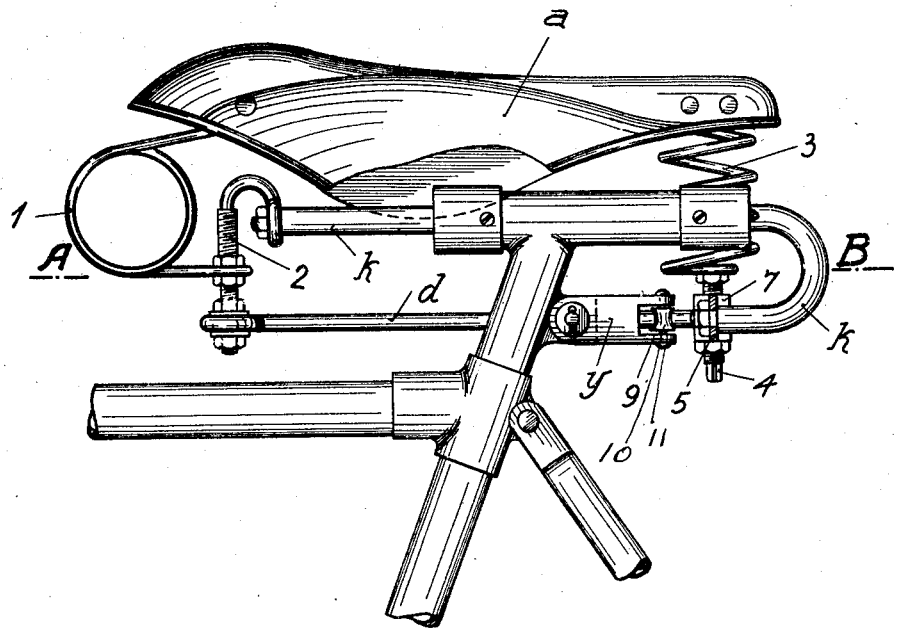
Fig. 1 is a side elevation partly in section of the sliding saddle.
Figure 2:
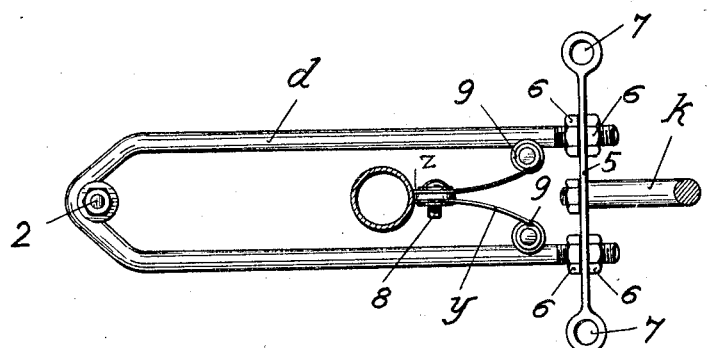
Fig. 2 is a section on line A—B of Fig. 1.

The sliding frame $d$ is composed of two parallel arms of equal direction and of any convenient cross section, the ends of the arms being screw connected with the bridge 5 in such a manner that the nuts 6 form the connection. The parts of equal direction of the arms form the sliding path and they determine by their profile the construction of the elements which slide upon the same. The front bent part of the sliding frame is connected with the slide rod $k$ by means of a screw 2 having an eye, the front seat spring 1 being attached to said eye. The bridge 5 is screw connected directly with the curved rear end of the slide rod $k$. The special-curved shape of the screw 2, the shaft of which is so long as possible, permits of raising the front end of the seat into the most comfortable position. The ends of bridge 5 form eyes 7 to which the rear seat springs 3 are attached by means of the screws 4. The screws 4 permit also to adjust the seat $a$ in vertical direction. The blade spring $y$ consists of two separate parts which are pivotally mounted on a bolt 8 of the clamping clip $z$. The free ends of the arms of the blade spring $y$ have apertures and the remaining parts are bent to form eyes 9 in which the axles 11 of the rollers 10 are mounted.

I claim:—

A tiltable sliding saddle for bicycles, comprising in combination with the seat, and the seat support, having a horizontal tube at the upper end, a rod slidably mounted in said horizontal tube and curved downward at the rear end, a horizontal bow-shaped frame open at the rear end parallel and below said rod, a vertical screw bolt fixed in the closed front end of said bow-shaped frame and having a rearwardly curved top end, an eye in said top end of said vertical screw bolt and mounted on said slidable rod, a transverse rod fixed in the open rear end of said bow-shaped frame the curved rear end of said slidable rod being fixed to said transverse rod, a front seat spring attached at one end to said vertical screw bolt, two springs supporting the rear part of said seat and having their lower ends fixed on the ends of said transverse rod, two blade springs fixed with the front ends on said saddle support and having their rear ends bent outwards in opposite direction, and a roller in the rear end of each blade spring bearing onto the inner surfaces of the corresponding arms of said bow-shaped frame.

In testimony whereof I affix my signature.

HEINRICH RENKHOFF.